F. E. BERTRAND.
METHOD OF PREPARING SOLES.
APPLICATION FILED FEB. 26, 1916.
1,236,661. Patented Aug. 14, 1917.
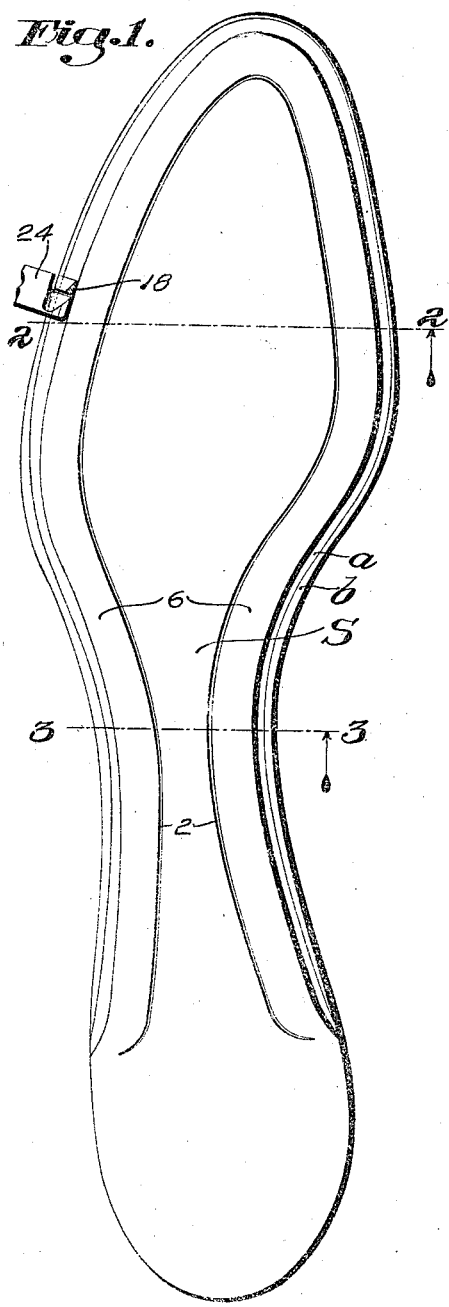
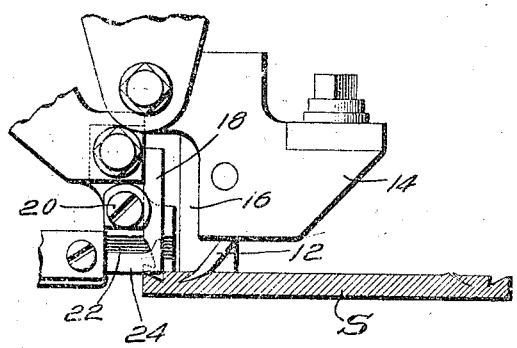
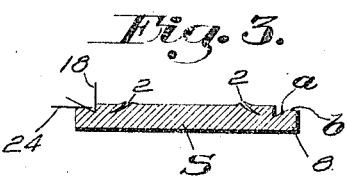
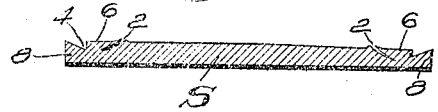
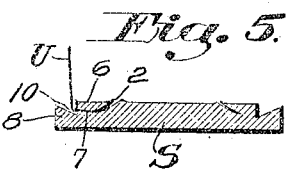
Witness
Frederick S. Greenbaum
Inventor
Frederic E. Bertrand
by his attorneys
Phillips, Van Everen & Fish

UNITED STATES PATENT OFFICE.

FREDERIC E. BERTRAND, OF LYNN, MASSACHUSETTS, ASSIGNOR TO UNITED SHOE MACHINERY COMPANY, OF PATERSON, NEW JERSEY, A CORPORATION OF NEW JERSEY.

METHOD OF PREPARING SOLES.

1,236,661.  Specification of Letters Patent.  Patented Aug. 14, 1917.

Application filed February 26, 1916. Serial No. 80,614.

*To all whom it may concern:*

Be it known that I, FREDERIC E. BERTRAND, a citizen of the United States, residing at Lynn, in the county of Essex and State of Massachusetts, have invented certain new and useful Improvements in Methods of Preparing Soles; and I do hereby declare the following to be a full, clear, and exact description of the invention, such as will enable others skilled in the art to which it appertains to make and use the same.

This invention relates to a method of preparing soles for use in the manufacture of turn shoes and to the turn sole produced by practising the method.

In order to explain more clearly than otherwise would be possible the object of the present invention and the advantages which it provides over the method now employed, the results produced by both the method now usually practised and of the method proposed by this invention, are illustrated in the accompanying drawings. Referring to these drawings, Figure 1 is a plan view of the flesh side of a turn sole made in accordance with the method herein disclosed.

Fig. 2 is a cross-sectional view of the sole shown in Fig. 1, taken on the plane indicated by the line 2—2, Fig. 1, and also shows tools which may be employed in practising the present method;

Fig. 3 is a cross-sectional view of the sole shown in Fig. 1, taken on the line 3—3, Fig. 1; and Figs. 4 and 5 are forepart and shank part cross-sectional views of a typical defective sole illustrating the difficulties in turn shoe making overcome by the present method.

In preparing a turn sole for attachment to the upper a channel cut 2 is made along the margin of the flesh side of a sole blank and a shoulder cut 4 is made parallel to and outside of the channel cut. These two cuts form between them a rib or "between substance" 6, to which the upper of the shoe is secured by a sewed seam that pulls the upper and adjacent materials snugly into the shoulder cut. It is desirable in the inseaming operation, for reasons well understood by those skilled in this art, to have the channel cut of a uniform depth throughout its length. Accordingly the knife or tool that makes the channel cut is gaged to cut uniformly from the flesh side of the sole. The shoulder cut 4 defines a "feather" 8, this term designating herein the part of the sole that lies between the base of the rib and the extreme edge face of the sole. Since, in a turn sole, the edge face of the feather constitutes the exposed edge of the sole in the finished shoe, it is desirable to have this edge face of a uniform thickness, both because of the unattractive appearance that a sole edge of varying thickness presents, and because the edge setting and burnishing tools will not accurately fit, and therefore will not properly finish, a sole edge that varies substantially in thickness. Accordingly it is customary to gage the knife that makes the shoulder cut from the grain side of the sole S and thus to produce an edge face on the sole of a uniform thickness.

The outsole stock, from which a sole blank is cut, is seldom of a uniform thickness, and accordingly the channeling of a sole in the manner just described results in producing a shoulder cut 4 which is deeper at some places, and shallower at others, than is the channel cut 2, due to the variations in thickness of the stock. If the shoulder cut is materially deeper than the channel cut, as in the sole shown in Fig. 5, the upper V will not be pulled into the bottom of the shoulder by the inseam stitches 7, and accordingly when the shoe is turned a wide and unsightly crease 10, Fig. 5, will be left between the upper and the feather, due to inability to beat the sole edge up to the vamp, resulting also in an exposure of the inseam stitches. This undesirable condition of the crease is ordinarily designated by manufacturers as "grinning." On the other hand, if the shoulder cut is materially shallower than the channel cut, as indicated at the right of Fig. 4, the needle of the machine that stitches the upper to the sole is liable to enter the upper marginal surface of the feather 8 at a point outside of the shoulder, with the result that the upper will not be secured firmly against the shoulder by the stitches, and the feather in the finished shoe will vary in width. Both of these results of course, are objectionable. While excellent results are secured by having the depth of the shoulder and channel cuts equal, the ideal condition is to have the base of the shoulder cut just a mite higher than the base of the channel cut, for, as will be obvious to those skilled in the art, the needle will then sew a tighter seam and will invariably cause the vamp to hug the sole after the shoe is turned.

The difficulties just referred to might be overcome by skiving the sole blank before it is channeled, that is, reducing it to a uniform thickness. This practice is highly objectionable both because it introduces an additional sole fitting operation, and more particularly because it wastes a substantial percentage of the strongest and toughest portion of the outsole stock.

The object of the present invention is to devise a method of making a turn sole from a sole blank of variable thickness, in which both the channel and shoulder cuts shall be of substantially uniform depth and the edge of the feather produced by the shoulder cut shall have a substantially uniform thickness.

This object may conveniently be accomplished by gaging both the channel and the shoulder cuts from the flesh side of the sole, and reducing the feather to a uniform thickness of edge by means of a third knife whose cut is gaged from the grain side of the sole.

An arrangement of knives of this character which may conveniently be mounted in a channeling machine of the type illustrated and described in my United States Patent No. 1,030,704, granted June 25, 1912, is illustrated in Fig. 2. The channel knife is shown at 12, clamped in a knife block 14 in which also is secured a presser foot 16. This is the usual method of gaging a channel knife and since this knife projects a fixed distance below the presser foot it can only cut into the flesh side of the sole to a given or uniform depth. The shoulder knife 18 is also clamped by a screw 20 rigidly but adjustably to a member 22 which bears on the work and constitutes the gage or presser foot for the shoulder knife, limiting its depth of cut on the flesh side of the sole in the same way that the depth of cut of the channel knife 12 is limited. A feather edge reducing knife 24 is mounted immediately behind the shoulder knife 18, and is gaged from the grain side of the sole S or, in other words, is mounted at a fixed height above the table on which the sole S is supported while the knives are operating on it. The knife 24 thus cuts sufficient material away from the flesh side of the feather to reduce the edge of the feather to a uniform thickness. The cutting edges of the two knives 18 and 24 overlap, as indicated best in Fig. 3, so that they coöperate to remove a strip of material from the margin of the sole of such dimensions as to reduce the feather edge to a uniform thickness and to form, with the channel cut, a rib having the opposite edges of its base lying at a uniform depth from the flesh side of the sole. Preferably, these cutting operations are all performed simultaneously so that only one handling of the sole is required.

Since the two knives 18 and 24 are arranged at an angle to each other, they form a feather 8, as indicated in Fig. 3, the upper marginal face of which consists of two surfaces $a$ and $b$, the beveled surface $a$ being formed by the knife 18 and the flat face $b$ being formed by the knife 24. Since the feather edge knife 24 is gaged from the grain side of the sole, the width of the face $b$ will vary as the thickness of the sole varies, being wider where the sole is thick, as indicated in the shank portion of the sole shown in Fig. 1, and narrower where the sole is thin, as indicated at the toe portion of the sole shown in Fig. 1. This variation, however, is not objectionable.

As a result of the method herein described the margin of the sole produced by practising the method is provided with a channel and shoulder cut of even depth throughout since these cuts are both gaged from the flesh side of the sole and, therefore, follow all its variations in thickness, and also with a feather having an edge of an even thickness since this cut is gaged from the grain side of the sole. In another application Serial No. 80,613 filed concurrently herewith I have shown a machine designed to carry out this method in substantially the manner above indicated, although those skilled in the art will recognize that the method might be practised in other ways than that specifically disclosed herein.

Having thus described the invention, and the preferred method of practising it, it is definitely stated in its true scope in the following claims.

What is claimed as new, is:

1. That improvement in the method of making a turn sole from a blank of variable thickness which consists in making a marginal channel cut and a shoulder cut of substantially the same depth to form a stitch receiving rib, and reducing the edge of the feather defined by the shoulder cut to a uniform thickness.

2. That improvement in the method of making a turn sole from a blank of variable thickness which consists in making a marginal channel cut and a shoulder cut of substantially the same depth to form a stitch receiving rib, and simultaneously reducing the edge of the feather defined by the shoulder cut to a uniform thickness.

3. That improvement in the method of making a turn sole from a blank of variable thickness which consists in making marginal channel and shoulder cuts in the flesh side of the sole to form a stitch receiving rib, gaging the depth of said cuts from the flesh side of the sole, and simultaneously cutting sufficient material away from the flesh side of the feather defined by the shoulder cut to reduce the feather edge to a uniform thickness.

4. That improvement in the method of making a turn sole from a blank of variable thickness which consists in cutting a marginal channel of substantially uniform depth in the flesh side of the sole, and simultaneously with said operation cutting out a strip of material along the margin of the sole outside of the channel cut of such dimensions as to reduce the edge of the feather thus defined to a uniform thickness and also to form a stitch receiving rib having both edges of its base lying at substantially a uniform depth from the flesh side of the sole.

5. That improvement in the method of forming the marginal portions of turn soles which consists in making a shoulder cut in the flesh side having an even depth regardless of a varying thickness in the sole blank, and reducing the edge of the feather defined by the shoulder cut to a uniform thickness.

6. A turn sole having a body portion of varying thickness a portion of the marginal edge of which is provided with a channel of uniform depth, a shoulder of uniform depth, and a feather having an edge of uniform thickness.

FREDERIC E. BERTRAND.